(12) United States Patent
Nobelen

(10) Patent No.: US 6,532,563 B2
(45) Date of Patent: Mar. 11, 2003

(54) INCREMENTAL REDUNDANCY RADIO LINK PROTOCOL

(75) Inventor: Robert van Nobelen, Christ Church (NZ)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 10/040,790

(22) Filed: Jan. 9, 2002

(65) Prior Publication Data

US 2002/0099994 A1 Jul. 25, 2002

Related U.S. Application Data

(63) Continuation of application No. 09/178,575, filed on Oct. 26, 1998.
(60) Provisional application No. 60/064,223, filed on Oct. 29, 1997.

(51) Int. Cl.[7] .................... H03M 13/00; H04L 1/18
(52) U.S. Cl. ............................... 714/751; 714/776
(58) Field of Search ........................... 714/751, 776, 714/790

(56) References Cited

U.S. PATENT DOCUMENTS

| | | | |
|---|---|---|---|
| 4,584,685 A | 4/1986 | Gajjar | 371/35 |
| 5,600,663 A * | 2/1997 | Ayanoglu et al. | 714/774 |
| 5,677,918 A | 10/1997 | Tran et al. | 371/32 |
| 5,701,298 A * | 12/1997 | Diachina | 370/346 |
| 5,835,508 A * | 11/1998 | Kushita | 714/748 |
| 5,844,918 A * | 12/1998 | Kato | 714/751 |
| 5,870,406 A * | 2/1999 | Ramesh et al. | 371/6 |
| 5,881,069 A * | 3/1999 | Cannon et al. | 714/748 |
| 5,983,382 A * | 11/1999 | Richard Pauls | 714/744 |
| 6,021,516 A * | 2/2000 | Okajima et al. | 714/748 |
| 6,119,167 A * | 9/2000 | Boyle et al. | 709/234 |
| 6,126,310 A * | 10/2000 | Osthoff et al. | 714/751 |
| 6,189,123 B1 * | 2/2001 | Anders Nystrom et al. | 714/751 |
| 6,275,488 B1 * | 8/2001 | Cudak et al. | 370/347 |
| 6,353,907 B1 * | 3/2002 | van Nobelen | 714/746 |

FOREIGN PATENT DOCUMENTS

| | | | |
|---|---|---|---|
| EP | 0 635 952 | 1/1995 | |
| EP | 635952 A1 * | 1/1995 | |
| EP | 0 713 302 | 5/1996 | |
| EP | 713302 A2 * | 5/1996 | H04L/1/00 |
| JP | 8223624 | 8/1996 | |
| JP | 2194619 | 7/1997 | |

OTHER PUBLICATIONS

Stephen B. Wicker, "Error Control Systems", Prentice–Hall 1995.*

TIA/EIA–136–310–A and TIA/EIA–136–131–B Standards by Telecommunications Industry Association.*

Ender Ayanoglu, "Airmail: A link–layer protocol for wireless networks"; Wireless Networks I, Feb. 1995, No. 1, pp. 47–60, Amsterdam, NL.*

Ayanoglu E et al.: *Airmail: A Link–layer Protocol for Wireless Networks,* Wireless Networks, vol. 1, No. 1, Feb. 1995, p. 47–59.

* cited by examiner

*Primary Examiner*—Albert Decady
*Assistant Examiner*—Joseph D. Torres
(74) *Attorney, Agent, or Firm*—Kenyon & Kenyon

(57) ABSTRACT

A method and apparatus for sending blocks of data without any error correcting coding is described. If the block is received without an error then the next block of data is transmitted. If the block is received with an error, the receiving device sends a message requesting error correcting information. The transmitting device sends the error correcting information in specified increments until the receiving device can successfully decode the block without error. Once the block is received without errors, the next block of data is transmitted.

20 Claims, 8 Drawing Sheets

INCREMENTAL REDUNDANCY RADIO LINK PROTOCOL

This application is continuation of U.S. application Ser. No. 09/178,575, filed Oct. 26, 1998 and claims the benefit of U.S. Provisional Application Ser. No. 60/064,223, filed Oct. 29, 1997, both of which are incorporated herein by reference in their entireties.

FIELD OF THE INVENTION

The invention relates to communication networks in general. More particularly, the invention relates to a radio link protocol for increasing bandwidth efficiency for a network.

BACKGROUND OF THE INVENTION

The demands on an individuals personal and professional time has created the need to communicate with others while on the move. Cellular systems provide this capability. As the number of individuals seeking to use cellular services increases, however, cellular systems are quickly running out of capacity. The term "capacity" loosely refers to the number of cellular calls a system can carry at any one time. This is evidenced by the rising number of "busy" signals the average cellular user receives while attempting to place a call in heavily populated areas such as within the downtown portion of a city. Consequently, cellular providers are turning towards digital cellular technologies to increase the capacity of their systems. Accordingly, this movement led to the establishment of a digital cellular standard in the United States referred to as Electronic Industries Association (EIA) Interim Standard IS-136, Rev 1.1, "800 MHz TDMA Cellular—Radio Interface—Mobile Station—Base Station Compatability—Digital Control Channel," Oct. 11, 1995 (IS-136).

IS-136 defines a digital cellular system utilizing a variety of technologies to enhance the capacity of a system, such as using Time Division Multiple Access (TDMA), voice compression using Vector Sum Linear Prediction Coding (VSELP), and digital signaling. In addition to the above, IS-136 uses four-level phase shift keying (4-PSK) modulation. Modulation refers to the process of converting digital data into analog tones that can be transmitted over radio frequency (RF) spectrum.

A revision to IS-136 has been proposed. The revised IS-136 standard is referred to as "IS-136+." IS-136+ attempts to achieve higher data rates over IS-136 by, among other things, increasing the modulation format from 4-PSK to 8-PSK or 16-Quadrature Amplitude Modulation (QAM). While increasing the modulation format increases the capacity of the system, it also increases the number of frame errors in the system, especially at low Signal-to-Noise Ratio (SNR).

Conventional IS-136 and IS-136+ systems use a radio link protocol referred to as EIA IS-130, Rev A, "800 MHZ Cellular Systems—TDMA Radio Interface—Radio Link Protocol 1, " Jul. 25, 1997 (IS-130) to correct frame errors. IS-130, however, is unsatisfactory for a number of reasons, two of which are discussed below.

The first problem with IS-130 is that it does not account for the SNR for a communication channel. IS-130 uses a technique referred to as "⅚ encoding" as a means of performing error correction for data transmitted from a transmitter to a receiver. The technique of ⅚ encoding means for every five bits of data, a sixth bit is introduced to correct errors. The problem with ⅚ encoding, however, is that it introduces a fixed amount of overhead for every five bits of actual data. If a communication channel has a high SNR, which means there is a lower likelihood of errors occurring during transmission, many times there is no need for the extra overhead. In other words, a block of transmitted data is received without any errors, and therefore the bandwidth spent transmitting the error correcting bits could have been used to transmit actual data. Conversely, if a communication channel has a low SNR, which means there is a greater likelihood of errors occurring during transmission, in many instances the errors are so numerous that ⅚ encoding cannot adequately correct them. Again, the resources used to transmit the error correcting bits are wasted. Moreover, this latter point also gives rise to a second problem associated with IS-130.

The second problem with IS-130 is that if the received block of data has errors that cannot be corrected, the entire block is discarded and is resent by the system. This means that the bandwidth spent transmitting and receiving the block is wasted. The time spent resending the block takes up resources that could otherwise be devoted to carrying extra calls for the system, i.e., increasing the capacity of the system.

In view of the foregoing, it can be appreciated that a substantial need exists for a radio link protocol that solves the above-discussed problems.

SUMMARY OF THE INVENTION

One embodiment of the invention includes a method and apparatus for sending blocks of data without any error correcting coding. If the block is received without an error then the next block of data is transmitted. If the block is received with an error, the receiving device sends a message requesting error correcting information. The transmitting device sends the error correcting information in specified increments until the receiving device can successfully decode the block without error. Once the block is received without errors, the next block of data is transmitted.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
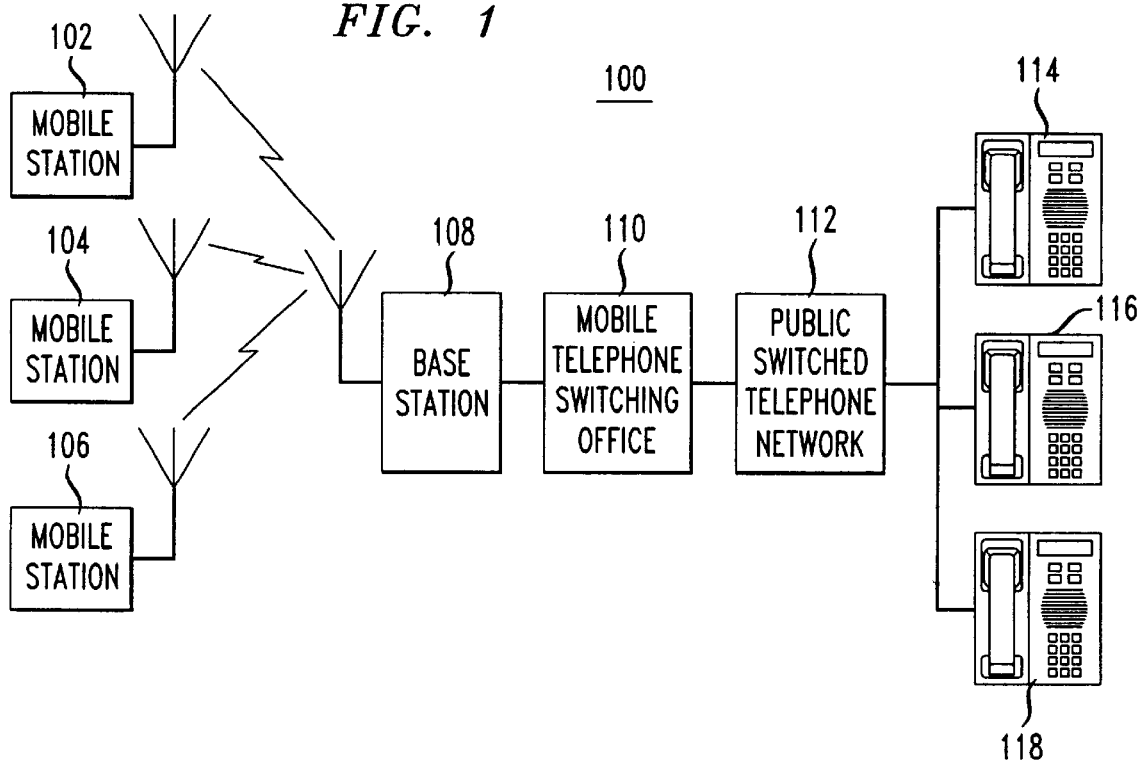
FIG. 1 illustrates a cellular communications system suitable for practicing one embodiment of the invention.

This embodiment of the invention includes a hybrid acknowledgment/request (ARQ) based Radio Link Protocol for IS-136+ that offers higher data throughput compared to the Radio Link Protocol as defined by IS-130. This embodiment of the invention operates by transmitting data uncoded on the initial transmission and incrementally transmits parity information upon receipt of a negative acknowledgment from the receiver. The parity information is derived from a rate ½ binary convolutional code. The receiving protocol retains received information in the form of soft decision bits and jointly decodes the data and parity until decoding is successful. The gain of the protocol is between 2 to 5 dB at low to mid SNR ranges, and 20% throughput at high SNR.

IS-136+ is an extension of IS-136 aiming to achieve higher data rates by increasing the modulation format from 4-PSK to 8-PSK and/or 16-QAM. The penalty incurred by a higher modulation format is an increase in the frame error rate (FER) especially at low SNR. The radio link protocol defined in IS-130 (RLPI) is designed to correct the layer-1 frame errors by using a selective ARQ scheme to retransmit lost frames. Although the layer-1 and layer-2 systems are individually optimized, when operating jointly there is a mismatch leading to inefficiencies, especially at extreme values of SNR. The main cause for sub-optimal performance of the joint system is a mismatch between the layer-1 code rate and the average SNR the system is operating at. At low SNR, the fixed rate ⅚ encoding of layer-1 is too weak, leading to frame error rates of as much as 80%, while at high SNR, the channel is of sufficient quality that coding is almost unnecessary.

This embodiment of the invention modifies the IS-130 radio link protocol and the layer-1 specification such that the code rate is adapted as necessary to match the average SNR of the system and the realization of the random processes affecting the transmitted signal. More particularly, the definition of layer-1 is modified to be an uncoded data transport system that delivers bits to layer-2 in a soft decision format, that is, likelihood information for each bit is retained. The encoding task is moved to layer-2 in such a way that the code rate is dynamically selected as required. This is implemented by initially transmitting the data uncoded, followed by transmitting parity information as determined by the receiver state feedback information. In other words, the power of the code is increased as required. Although this embodiment of the invention is discussed in terms of modifying IS-130, it can be appreciated that other radio link protocols can be also modified using the principles discussed herein and still fall within the scope of the invention.

A general overview of the steps implemented in accordance with one embodiment of the invention is as follows. A block of data is sent from a first network device to a second network device. The first network device determines whether the block was received with an error. If the block was received with an error, the first network device sends increments of error correcting information until the error has been corrected or until all available error correcting information for the block has been sent.

In particular, the first network device generates a block of bits at the first network device, encodes the block, and sends the encoded blocks to a second network device. The first network device determines whether the encoded block was received by the second network device with an error. The first network device sends increments of error correcting information to the second network device if the encoded block was received with an error.

The first network device determines whether the encoded block was received with errors as follows. First, the first network device receives a first error message from the second network device. A status bit associated with the block is set and evaluated.

The first network device generates the block of bits as follows. The first network device receives a service data unit (SDU) comprised of a series of bits. The first network device generates error detection bits for the service data unit bits. The first network device then concatenates the SDU bits and the error detection bits to form a single block.

The first network device encodes the block as follows. The first network device generates error correcting bits for the block. It then allocates the data bits and error detection bits to data intermediate blocks, and the error correcting bits to error correcting intermediate blocks. The first network device interleaves bits from the data intermediate blocks to form data sub-blocks, and bits from the error correcting intermediate blocks to form error correcting sub-blocks.

The first network device sends the encoded block as follows. The first network device forms a current data sub-block into a data packet data unit, and sends the data packet data unit to the second network device. The first network device then determines whether the data packet data unit was received by the second network device with an error. The first network device resends the data packet data unit until it is received by the second network device without an error. This sequence continues for each data sub-block for the block until all data sub-blocks are received by the second network device without an error.

The first network device determines whether the data packet data unit was received by the second network device with an error as follows. The first network device receives a second error message from the second network device indicating a data packet data unit was received with an error. The first network device sets a status bit associated with the data sub-block used to form the data packet data unit, and then evaluates or checks the status bit.

The first network device forms the current data sub-block as follows. The first network device encodes a header block for each encoded sub-block. Each encoded header block is then added to the encoded sub-block.

The first network device sends error correcting information as follows. The first network device forms a current error correcting sub-block into a packet data unit, and sends the error correcting packet data unit to the second network device. The first network device then determines whether the error correcting packet data unit was received by the second network device with an error. The error correcting sub-block is resent and re-evaluated until the error correcting packet data unit is received by the second network device without an error. The first network device determines whether the block was corrected using the error correcting sub-block used to form the error correcting packet data unit. If the block was not corrected, the sequence is repeated using a next error correcting sub-block until the block is corrected or until each error correcting sub-block for the block is received by the second network device without an error.

The first network device determines whether the error correcting packet data unit was received by the second network device with an error as follows. The first network device receives a third error message from the second network device indicating the error correcting packet data unit was received with an error. It sets a status bit associated with the error correcting sub-block used to form the error correcting packet data unit, and it evaluates the status bit.

The first network device determines whether the block was corrected using the error correcting sub-block used to form the error correcting packet data unit as follows. The first network device receives a fourth error message from the second network device indicating the block was not corrected using the error correcting sub-block. A status bit associated with the block is set and evaluated.

The first network device forms the error correcting packet data unit as follows. It encodes a header block for each encoded sub-block. The encoded header block is then added to the encoded sub-block.

The next section will describe in general terms the steps performed by the second network device in accordance with one embodiment of the invention.

The second network device receives an encoded block at the second network device and performs the following steps. It decodes the received block and determines whether the block has an error. The second network device then corrects the error using error correcting information sent by the first network device. The second network device then generates or recovers an SDU from the block.

The second network device receives the encoded block as follows. The second network device receives a current data packet data unit from the first network device, and it determines whether the data packet data unit has an error. This is repeated until the data packet data unit is received without an error. The entire sequence is repeated with a next data packet data unit until each data packet data unit for the block is received without an error.

The second network device determines whether the data packet data unit has an error as follows. The second network device decodes the data packet data unit into header bits and error detection bits, and it tests the header bits using the error detection bits. The second network device then sets a status bit for a data sub-block indicated by the header bits in accordance with the test results, and it evaluates the status bit.

The second network device decodes the received block as follows. It first retrieves data bits and error detecting bits from the received data sub-blocks. It then forms a service data unit.

The second network device determines whether the received block as an error as follows. The second network device tests the SDU using the error detection bits. It then sets a status bit associated with the block in accordance with the test, and it evaluates the bit.

The second network device corrects the received block as follows. The second network device receives a current error correcting protocol data unit, and it determines whether the error correcting packet data unit has an error. It then sends a third error message to the first network device. This is repeated until the error correcting packet data unit is received by the second network device without an error. The second network device determines whether the block was corrected using the error correcting sub-block used to form the error correcting packet data unit. If not corrected, the entire sequence is repeated with a next error correcting sub-block until the block is corrected or until each error correcting sub-block for the block is received by the second network device without an error.

The second network device determines whether the block was corrected using the error correcting sub-block used to form the error correcting packet data unit as follows. The block is corrected using the bits from the error correcting sub-block. The block is tested using the error detection bits. The second network device sends a fourth error message to the first network device in view of the test results, and it sets a status bit associated with the block. The status bit is then evaluated.

Referring now in detail to the drawings wherein like parts are designated by like reference numerals throughout, there is illustrated in FIG. 1 a cellular communications system suitable for practicing one embodiment of the invention. As shown in FIG. 1, a cellular communications system 100 comprises mobile stations 102, 104 and 106 in communication with a base station 108 over a plurality of radio-frequency (RF) channels. Base station 108 is connected to a mobile telephone switching office (MTSO) 110. MTSO 110 is connected to a public switched telephone network (PSTN) 112, which in turn is connected to audio interface devices 114, 116 and 118. It is worthy to note that cellular communications system 100 is but one example of a system in which the present invention can be displayed, and that a person of ordinary skill in the art understands that system 100 can comprise any number of sub-systems and configurations and still fall within the scope of the invention.

In operation, for example, mobile station 102 requests a communication channel for completing a call to audio interface device 118. Base station 108 establishes the communications channel with mobile station 102 and with audio interface device 118 via MTSO 110 and PSTN 112. Once the communication is established, mobile station 102 and audio interface device 118 begin communicating information.

Establishing the communications channel between base station 108 and mobile station 102, as well as managing the transfer of information between both, are accomplished in accordance with a series of communication protocols. These protocols manage different operations of the communications process, which are typically defined in terms of "layers," and are collectively referred to as a protocol stack. The protocol stack used by system 100 is described with reference to FIG. 2 below.

Figure 2:
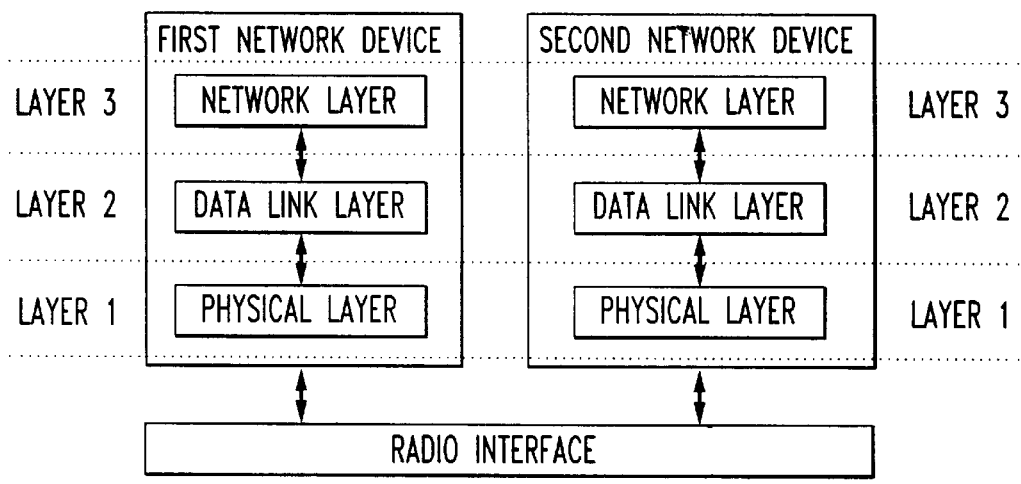
FIG. 2 is a protocol stack suitable for practicing one embodiment of the invention.

FIG. 2 is a protocol stack suitable for practicing one embodiment of the invention. As shown in FIG. 2, mobile station 102 communicates with base station 108 over a radio interface 202 by utilizing a series of communication protocols broken down into three distinct layers. Layer 1 of the protocol stack is the physical layer. The physical layer is concerned with the transmission of unstructured bit streams over a physical link, involving such parameters as signal voltage swing, signal bit duration and so forth. In this embodiment of the invention, the physical layer operates in accordance with IS-136 or IS-136+. It is worthy to note that IS-136 and IS-136+ will be uniformly referred to as IS-136 unless differences between IS-136 and IS-136+ merit separate treatment. Layer 2 of the protocol stack is the data link layer. The data link layer provides for the reliable transfer of data across the physical link, such as sending blocks of data with the necessary synchronization, error control, flow control, and so forth. As currently defined, IS-136 and IS-136+ utilize a radio link protocol defined by IS-130 for the data link layer operations. Layer 3 of the protocol stack is the network layer. The network layer provides upper layers with independence from the data transmission and switching technologies used to connect systems. The network layer is responsible for establishing, maintaining and terminating connections. In this embodiment of the invention, the network layer operates in accordance with any network layer protocol suitable for use with IS-136+ and IS-130.

This embodiment of the invention relates to the physical layer (layer 1) and data link layer (layer 2) for the above-described protocol stack. The IS-136 layer-1 specification for data transport delivers packets of 216 bits using a rate 5/6 binary convolutional code and π/4 offset 4-DPSK modulation. IS-136+ aims to increase data rates by using higher modulation formats such as 8-PSK and 16-QAM. This embodiment of the invention modifies IS-136 layer-1 to transport frames of bits uncoded and deliver these to layer-2 in a soft decision format, that is, reliability information on each bit is included. It is assumed that the physical layer decides on the most appropriate modulation format (4-PSK, 8-PSK, 16-QAM) depending on channel conditions (average SNR and Doppler frequency). Such decisions can be based on measuring the average SNR over a number of slots and estimating the Doppler frequency $f_D$ as a function of the rate of change of the signal power. Further, this embodiment of the invention replaces the radio link protocol defined by IS-130 with an incremental radio link protocol (IRLP) described herein. As with IS-130, IRLP is a radio link protocol for asynchronously transporting data between unspecified layer-3 entities, and is positioned between the physical layer (layer-1) and the network layer (layer-3) as shown in FIG. 2.

Figure 3:
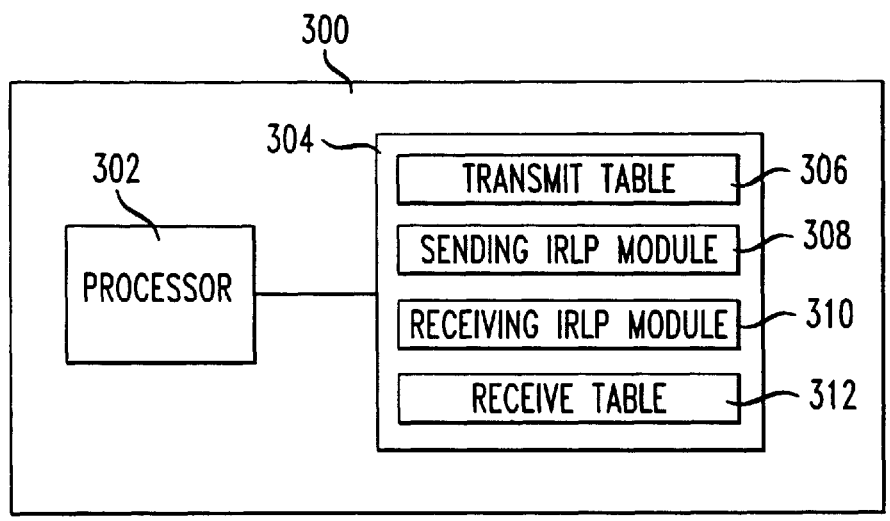
FIG. 3 is a block diagram of a computer system for implementing an Incremental Radio Link Protocol (IRLP) in accordance with one embodiment of the invention.

FIG. 3 is a block diagram of a computer system for implementing the IRLP in accordance with one embodiment of the invention. In this embodiment of the invention, functionality for the IRLP is implemented in the form of computer program segments stored in memory for execution by a processing device. Accordingly, FIG. 3 shows a computer system 300 comprising a processor 302 and a memory 304. Processor 302 includes any processor of sufficient processing power to perform the functionality for the IRLP described in detail below. Examples of processors suitable to practice the various embodiments of the invention include the Pentium®, Pentium® Pro, and Pentium® II microprocessors from Intel Corporation. Memory 304 can be any type of high-speed computer-readable memory such as random access memory (RAM), dynamic RAM (DRAM), read only memory (ROM), programmable read only memory (PROM), erasable programmable read only memory (EPROM), electronically erasable programmable read only memory (EEPROM), and so forth.

The overall functioning of computer system 300 is controlled by processor 302, which operates under the control of executed computer program instructions that are stored in memory 304. The computer program instructions implementing the functionality for this embodiment of the invention are stored in memory 304 and are shown as separate functional modules, namely, sending IRLP module 308 and receiving IRLP module 310. Also stored in memory 304 is transmit table 306 for use with sending IRLP module 308, and receive table module 312 for use with receiving module 310. Modules 308 and 310 will be described in further detail below.

Figure 4:
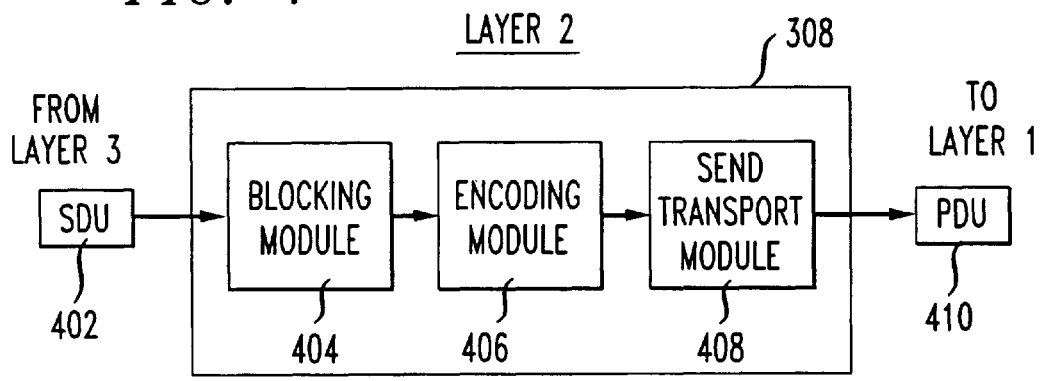
FIG. 4 is a block diagram of a sending IRLP module in accordance with one embodiment of the invention.

FIG. 4 is a block diagram of a sending IRLP module in accordance with one embodiment of the invention. As shown in FIG. 4, sending IRLP module 308 comprises a blocking module 404, an encoding module 406, and a send transport module 408. In operation, module 308 receives a Service Data Unit (SDU) 402 from the network layer (layer-3), transforms SDU 402 into a corresponding Packet Data Unit (PDU) 410, and transports PDU 410 over the physical layer (layer-1). In this embodiment of the invention, SDU 402 is one of a series of SDUs all in the form of octets which are to be delivered in-sequence to the layer-3 on the receiving side.

Figure 5:
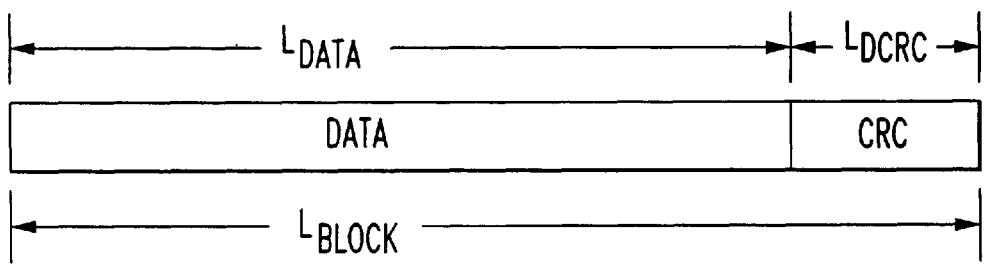
FIG. 5 shows the format of a block $B_i$ in accordance with one embodiment of the invention.

FIG. 5 shows the format of a block $B_i$ in accordance with one embodiment of the invention. Blocking module 404 accepts SDU 402 from the transmitting layer-3 and constructs a blocked SDU by concatenating $L_{Data}$ bits and a frame check sequence (FCS). In this embodiment of the invention, the FCS is a Cyclic (Bi) Redundancy Check (CRC) of length $L_{DCRC}$ computed over the corresponding data bits. The lengths $L_{Data}$ and $L_{DCRC}$ are design parameters to be optimized. The blocks $B_i$ of length $L_{Block}=L_{Data}+L_{DCRC}$ are passed to encoder 406 described below.

From the blocked SDU $B_i$, encoder 406 constructs a set of 2D sub-blocks of length $L_{Sub-block}=L_{Block}/D$. These sub-blocks are divided into two categories, namely data sub-blocks and parity sub-blocks denoted by $D_{ij}$ and $P_{ij}$ (j=1... D), respectively. The data sub-blocks $D_{i1}$ to $D_{iD}$ contain no redundancy and represent a 1 to 1 mapping to the blocked SDU $B_i$. The parity sub-blocks $P_{i1}$ to $P_{iD}$ contain parity information derived from $B_i$ and are used by the protocol for Forward Error Correction (FEC) upon decoding failure at the receiving side. In this embodiment of the invention, the sub-blocks are derived from $B_i$ by a rate ½ binary convolutional encoding as shown FIG. 6.

Figures 6, 7:
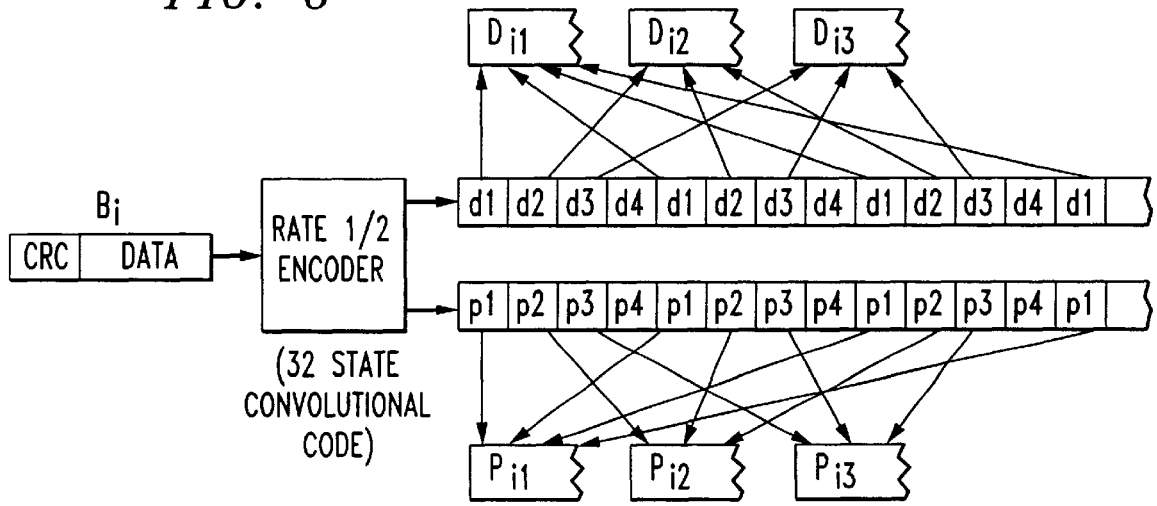
FIG. 6 illustrates rate 2 binary convolutional encoding in accordance with one embodiment of the invention.
FIG. 7 is an example of a transmit table in accordance with one embodiment of the invention.

FIG. 6 illustrates rate 2 binary convolutional encoding in accordance with one embodiment of the invention. This embodiment of the invention includes rate ½ binary convolutional encoding using a 32-state maximum Hamming distance code with octal generators (53,75). It is noted that the output bits resulting from the encoding are mapped to the sub-blocks in an interleaved manner to maximize time/code diversity. The encoded sub-blocks are passed to send transport module 408 for transmission.

Send transport module 408 transports the blocked SDUs $B_i$ to the receiving side and delivers them in-sequence to layer-3. Module 408 accomplishes this by initially sending just the data sub-blocks $D_{i1}$ to $D_{iD}$ followed by sending additional parity sub-blocks $P_{ij}$ whenever the receiver fails to decode block $B_i$ correctly. Send transport module 408 cannot discard the sub-blocks corresponding to a block $B_i$ until it has received a positive acknowledgment from the receiver for $B_i$, hence the protocol operates by maintaining in a table the sub-blocks that have been transmitted but not yet acknowledged. An example of a transmit table is shown in FIG. 7 as described below.

FIG. 7 is an example of a transmit table in accordance with one embodiment of the invention. FIG. 7 shows a transmit table operating with D=4. The transmit table contains the following fields:

1. NS is the sequence number assigned by the sending RLP to each block $B_i$. The sequence number is i mod WS, where WS is the window size.

2. B is a flag denoting whether or not the corresponding block $B_i$ has been successfully decoded by the receiver. A zero indicates the entry is undecoded.
3. R indicates whether module 408 needs to transmit more information about block $B_i$ to the receiving RLP.
4. MC indicates whether the protocol has sent non-consecutive multiple sub-blocks of the block $B_i$. A 1 indicates yes and 0 indicates no.
5. $B_{D1}$ to $B_{DD}$ respectively indicate whether sub-blocks $D_1 \ldots D_D$ have been received. A 0 indicates unreceived.
6. $B_{P1}$ to $B_{PD}$ respectively indicate whether sub-blocks $P_1 \ldots P_D$ have been received. A 0 indicates unreceived.
7. DATA contains the data and parity $\{D_{i1} \ldots D_{iD}, P_{i1} \ldots P_{iD}\}$ sub-blocks corresponding to block $B_i$.

Send transport module 408 transports data and parity sub-blocks in accordance with the following algorithm:

1. Read the feedback packet.
2. Update the flags B, $B_{D1} \ldots B_{DD}$, and $B_{P1} \ldots B_{PD}$. Set the index variable $K_R$ to the point in the entry most down in the table for which one of the B flags was updated (i.e., changed from 0 to 1) and for which MC=0.
3. For each transmit table entry from the first to the entry $K_R$ (determined at step 2), set R to 1 and MC to 0.
4. Delete all entries in the table with B set to 1.
5. If the last entry in the table has R set to 1, then go to step 9.
6. Find the first entry with R set to 1, move it to the bottom of the table and go to step 9. If there is no entry with R set to 1, go to step 7.
7. If the window is not full and there are data sub-blocks at the encoder output corresponding to a data block $B_i$, retrieve the sub-blocks $D_{i1} \ldots D_{iD}$ and $P_{i1} \ldots P_{iD}$ from the encoder, assign the next NS set B and MC to 0, R to 1 and place the entry at the bottom of the table, and go to step 9. Otherwise, go to step 8.
8. If the table is empty, stop. Otherwise, move the first table entry to the bottom of the table, set MC and R to 1, and go to step 9.
9. If all data sub-blocks have been transmitted, then send the next parity sub-block and set R=0. Otherwise send the next data sub-block.

Note that for transmission, the sub-blocks are combined with a header as described below.

Figure 8:
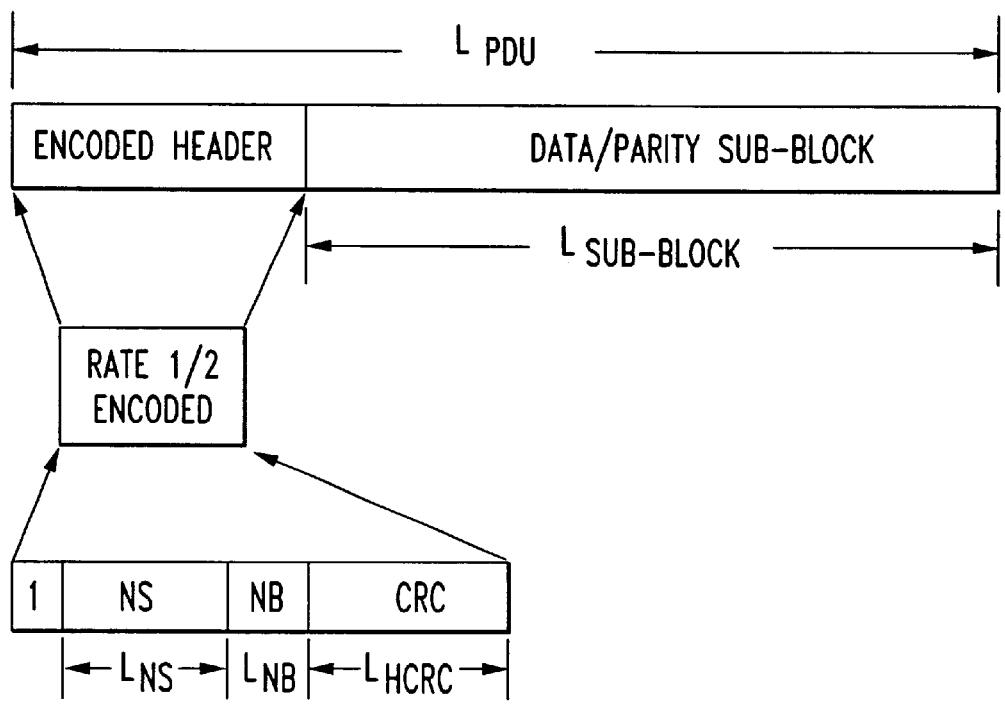
FIG. 8 illustrates a Packet Data Unit in accordance with one embodiment of the invention.

FIG. 8 illustrates a PDU in accordance with one embodiment of the invention. Module 408 sends the data sub-blocks encapsulated in the frame format shown in FIG. 8. The packet consists of two parts, namely an encoded header and a data or parity sub-block which is one of $\{D_{i1} \ldots D_{iD}, P_{i1} \ldots P_{iD}\}$ as decided by step 9 of the sending protocol procedure. The header is rate ½ encoded to ensure a high decoding reliability and contains the following fields:

1. NS is the block sequence number of length $L_{NS}$ bits.
2. NB is sub-block sequence number of length $L_{NB}$ bits. The number NB represents which sub-block of the block $B_i$ is being transmitted. The length $L_{NB}$ is related to D by:

$$L_{NB} = \lceil \log_2 2D \rceil.$$

3. A CRC of length $L_{HCRC}$ which is a FCS over the header bits only. This FCS is used to ensure the integrity of the header information.

The total PDU length is $L_{PDU}$ which is the layer-1 transmission packet length and is a design parameter to be optimized. It is a function of the number of IS-136 slots over which a transmission occurs and the modulation format. It is worthy to note that although the encoder described above is a 32-state rate ½ convolutional encoder, a block code with error correction and detection capabilities may be used and still fall within the scope of the invention.

Figure 9:
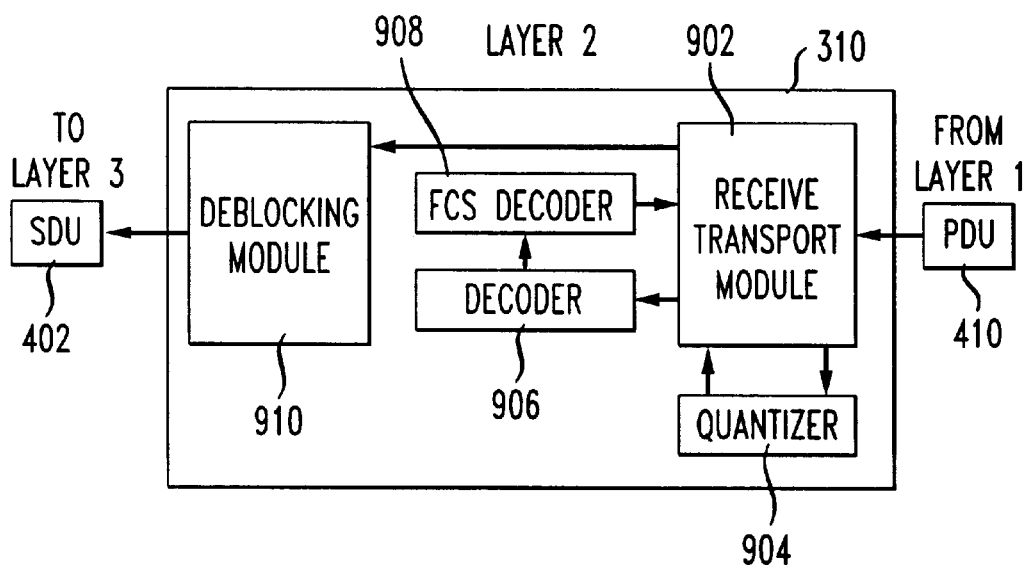
FIG. 9 is a block diagram of a receiving IRLP module in accordance with one embodiment of the invention.

FIG. 9 is a block diagram of a receiving IRLP module in accordance with one embodiment of the invention. Receiving IRLP module 310 is a peer for sending IRLP module 308 and is responsible for combining the received sub-blocks and jointly decoding them to recover the data blocks $B_i$. Module 310 receives PDU 410 from layer-1. Module 310 comprises a receive transport module 902, a quantizer 904, a decoder 906, a FCS decoder 908 and a deblocking module 910. Module 310 outputs a replica of SDU 402.

Module 310 utilizes receive table 312. Receive table 312 is complementary to transmit table 306 and stores the received sub-blocks and decoded blocks until they can be delivered in-sequence to layer-3. It is worthy to note that because the sub-blocks are retrieved from layer-1 in soft-decision format and need to be stored in receive table 312, a high memory overhead is incurred (for example, memory requirements would increase by a factor of 8 if 8 bits are stored per soft bit). Therefore for storage purposes, the soft information is quantized to q levels.

Figure 10:
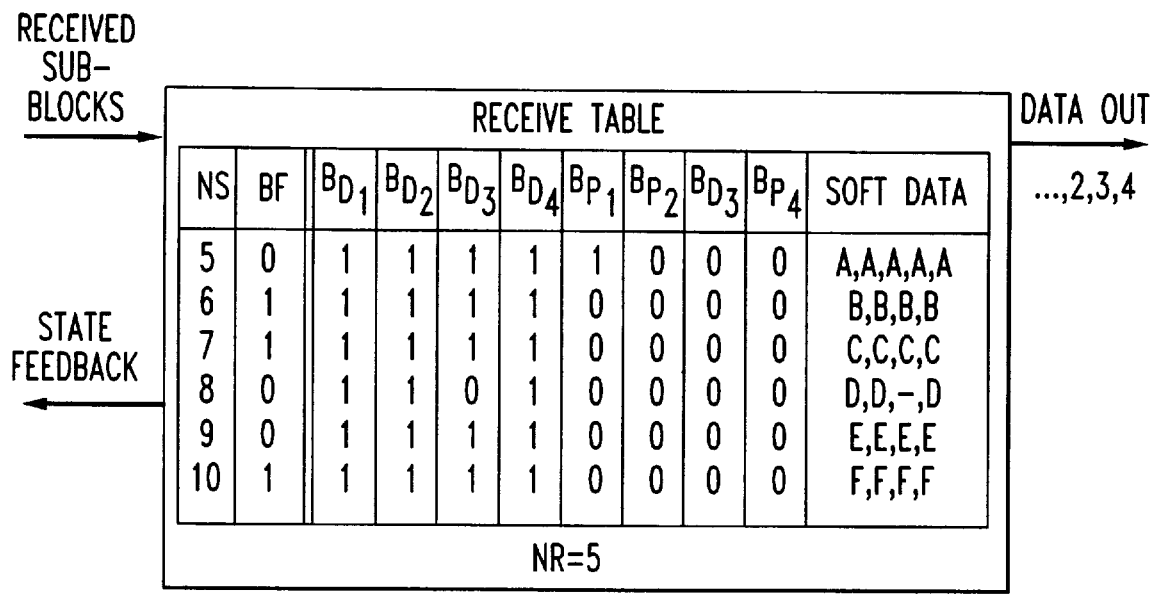
FIG. 10 illustrates a receive table in accordance with one embodiment of the invention.

FIG. 10 illustrates a receive table in accordance with one embodiment of the invention. Receive table 312 has the following fields:

1. NS is the block sequence number.
2. BF indicates whether the corresponding block has been decoded successfully. A 1 indicates success.
3. $B_{D1}$ to $B_{DD}$ respectively indicate whether data sub-blocks $D_1 \ldots D_D$ have been received.
4. $B_{P1}$ to $B_{PD}$ respectively indicate whether parity sub-blocks $P_1 \ldots P_D$ have been received.
5. DATA contains the soft-decision data and parity $\{D_{i1} \ldots D_{iD}, P_{i1} \ldots P_{iD}\}$ sub-blocks corresponding to block $B_i$.

Module 310 operates in accordance with following receive algorithm:

1. If available, retrieve a received soft-decision PDU $U_t'$ from layer-1, decode the header and check its CRC. If it fails, discard the PDU and go to step 6, else go to step 2.
2. If BF corresponding to the received NS is set to 1, then discard the received PDU and go to 6, else go to 3.
3. Set the flag $B_{Dj}$ or $P_{Dj}$ as specified by NB to 1. Use the quantizer to quantize the soft-decision bits of $U_t'$ and store the sub-block information at the location corresponding to NS and NB in the receive table. If this sub-block was already received earlier, then add the soft-decision metrics.
4. Pass the quantized soft-information sub-blocks corresponding to NS already stored in the table to the decoder and the full soft-information of the most recently received sub-block. Decode this set of sub-blocks and compute the FCS. If the FCS passes, store the decoded block in place of the soft-decision data and set the flag BF to 1.
5. If the first receive table entry has BF set to 1, then deliver the decoded blocks from the first entry up to, but not including, the first entry with BF=0. Delete the delivered receive table entries.

6. Set NR to the value of NS of the first entry in the table. If a PDU was received or the receive table is not empty, send the feedback packet created from the receive table. Otherwise send nothing.

Quantizer 904 reduces the storage requirements of the soft-decision bits received from layer-1. The quantizer converts the soft-decision information into a q level representation, where q is a design parameter that trades off receiver memory requirements against system performance. For a q level quantization, the memory requirements at the receiver per bit are given by $[\log_2 q]$. It is worthy to note that the quantization intervals should be optimized carefully, especially for low values of q.

Decoder 906 corresponds to encoding module 406 described above. It is passed the subset of received soft-decision sub-blocks $D'_1 \ldots D'_D, P'_1 \ldots P'_D$ and attempts to decode using the soft decision Viterbi algorithm. In this embodiment of the invention, the soft decision metrics are calculated by first letting $b_{ij}$ denote the $j^{th}$ bit of sub-block $D_i$ (or $P_i$). For transmission, the sequence of bits $b_{ij}$ is conventionally interleaved and mapped to the two-dimensional constellation C (e.g., 4-PSK, 8-PSK, etc.). The number of bits that map to a point in C is $l=\log_2|C|$, hence each point in C is labeled by l bit. If $b_{ij}$ maps to the $n^{th}$ bit of the label, then the set $C_o$ denotes the set of points in C for which bit n of its label is 0, and $C_l$ denotes the set of points in C for which bit n of its label is 1.

Determining the soft-decoding metric $m_{ij}$ for bit j of a sub-block $D'_i$ (or $P'_i$) consists of the following steps:

1. Let $r_j$ represent the received channel sample encoding bit j, and let $v_j$ represent the channel state corresponding to $r_j$.
2. Determine the symbol $C_o \epsilon C_o$ closest (measured by Euclidean distance) to $r_j/v_j$, and $c_1 \epsilon C_l$ closest to $r_j/V_j$.
3. Compute a noise variance estimate $N'_{oj}$ for bit j.
4. Compute the soft decision metric $m_{ij}$ for bit j.

$$m_{ij} = (|r_j - c_o v_j|^2 - |r_j - c_i v_j|^2)/N'_{oj}$$

The noise estimate for each bit at step 3 is desirable due to variations in the SNR level between transmissions of sub-blocks belonging to the block $B_i$. This decoding method provides a form of interference diversity. A practical method of estimating the SNR level for each bit is to estimate it by the SNR $N_{oi}$ measured across the sub-block $D_i$.

$$N'_{oi} = \sum_j \min_{c_k \in C} |r_j - v_j c_k|^2 / L_{Sub-block}$$

and using $N'_{oj} = N'_{oi}$. Decoder 906 output $B'_i$ corresponding to the sending $B_i$ is checked for correct decoding by the FCS decoder 908.

Decoder 906 passes $B'_i$ to FCS decoder 908. FCS decoder 908 computes the FCS of $B'_i$ and indicates to receiving IRLP module 310 whether the received block passed the frame check.

Deblocking module 910 performs the inverse operation to blocking module 404 described with respect to FIG. 4. Module 910 delivers the de-blocked SDUs to layer-3.

In this embodiment of the invention, sending IRLP module 308 and receiving IRLP module 310 operate using the following parameters. Although specific values are assigned for some parameters, it can be appreciated that these values are exemplary only and can vary while remaining within the scope of the invention. Specific parameter values for the length $L_{Block}$ of data blocks and $L_{sub-block}$ are given. These lengths are a function of the length $L_{PDU}$ of the layer-1 PDU, the number of sub-blocks D a block is divided into, and the PDU encoded header length $L_{EncHeader}$. These are related as follows:

$$L_{sub-block} = L_{PDU} - L_{EncHeader}$$

$$L_{Block} = D \times L_{Sub-block}$$

$$L_{data} = L_{block} - L_{DCRC}$$

The protocol overhead measured as one minus the ratio of the layer-3 data size to the transmitted data size is given by:

$$\text{Efficiency} = 1 - L_{Data}/(D \times L_{PDU})$$

Sending IRLP module 308 transports across the physical channel data packets of size $L_{PDU}$ bits and delivers these in soft decision format to the link layer. The underlying physical layer is IS-136+ which is similar to IS-136 except for employing a higher modulation format to enable increased data throughput.

Figure 11:
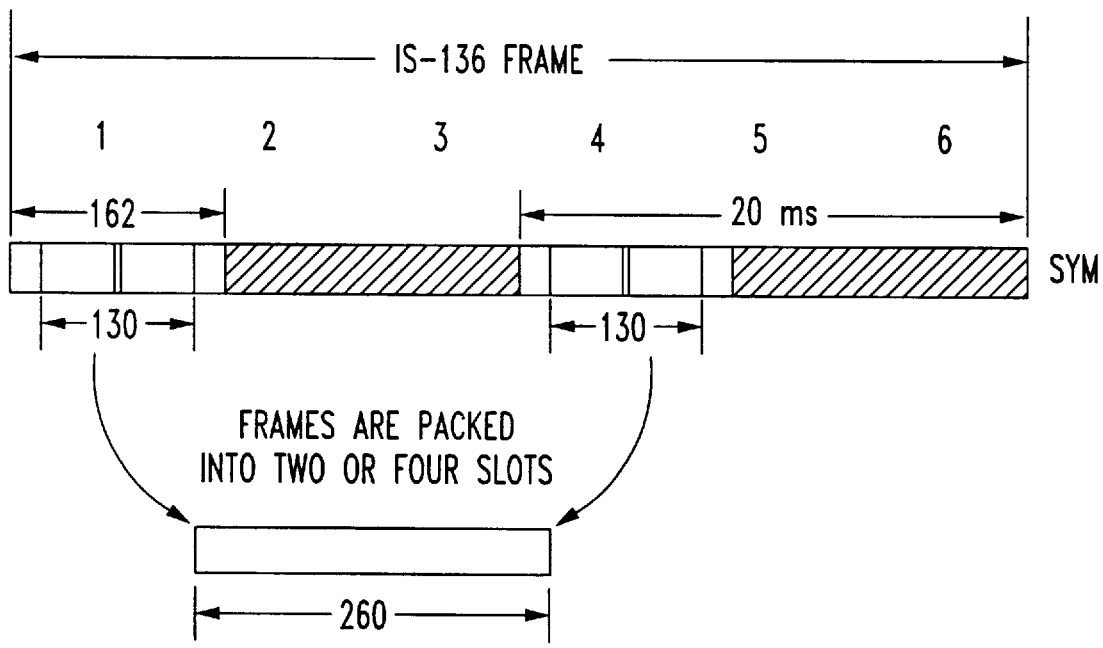
FIG. 11 illustrates a frame as defined by IS-136.

FIG. 11 illustrates a frame as defined by IS-136. Each 30 kHz IS-136 channel consists of frames of 40 ms duration. Each frame is divided into six slots of which two are allocated to a user for full-rate transmission. The symbol rate is 24300 symbols per second giving 162 symbols per slot. Of these 162 symbols, 130 are available for data transmission.

It is assumed that the physical layer determines via channel quality feedback the most appropriate modulation format to maximize overall data throughput. The practical choices of modulation formats are those transmitting 2, 3 or 4 bits per symbol. Table 1 lists some alternatives for each spectral efficiency.

TABLE 1

| bits/symbol | Coherent | Differential |
|---|---|---|
| 2 | 4-PSK | 4-DPSK |
| 3 | 8-PSK | 8-DPSK |
| 4 | 16-PSK, 16-QAM | 16-DPSK |

The link layer protocol requires a fixed length packet size $L_{PDU}$. In order to accommodate modulation mode switching, this size must be selected such that an integral number of PDUs can be transmitted over a fixed number of slots using each modulation format. This can be accomplished by choosing to transmit either over two slots with a PDU size of 260 bits, or over four slots with a PDU size of 520 bits as shown in Table 2.

TABLE 2

| bits/symbol | slots = 2, $L_{PDU}$ = 260 | slots = 4, $L_{PDU}$ = 520 |
|---|---|---|
| 2 | 2 × 260 | 2 × 520 |
| 3 | 3 × 260 | 3 × 520 |
| 4 | 4 × 260 | 4 × 520 |

The advantage of a greater PDU size is better protocol efficiency and higher interleaving depth as described below.

Tables 3 and 4 show the protocol block lengths and overhead as a function of D (the number of sub-blocks) for values of $L_{PDU}$=260 and $L_{PDU}$=520, respectively.

TABLE 3

|  | D = 1 | D = 2 | D = 3 |
|---|---|---|---|
| $L_{PDU}$ | 260 | 260 | 260 |
| $L_{NS}$ | 6 | 5 | 5 |
| $L_{NB}$ | 1 | 2 | 3 |
| $L_{HCRC}$ | 7 | 7 | 7 |
| $L_{Header}$ | 15 | 15 | 16 |
| $L_{EncHeader}$ | 40 | 40 | 42 |
| $L_{Sub-block}$ | 220 | 220 | 218 |
| $L_{Block}$ | 220 | 440 | 872 |
| $L_{DCRC}$ | 16 | 24 | 32 |
| $L_{Data}$ | 204 | 416 | 840 |
| Overhead | 21% | 20% | 19% |

TABLE 4

|  | D = 1 | D = 2 | D = 3 |
|---|---|---|---|
| $L_{PDU}$ | 520 | 520 | 520 |
| $L_{NS}$ | 6 | 5 | 5 |
| $L_{NB}$ | 1 | 2 | 3 |
| $L_{HCRC}$ | 7 | 7 | 7 |
| $L_{Header}$ | 15 | 15 | 16 |
| $L_{EncHeader}$ | 40 | 40 | 42 |
| $L_{Sub-block}$ | 480 | 480 | 478 |
| $L_{Block}$ | 480 | 960 | 1912 |
| $L_{DCRC}$ | 16 | 24 | 32 |
| $L_{Data}$ | 464 | 936 | 1880 |
| Overhead | 10.77% | 10% | 9.62% |

The protocol overhead is halved by transmitting over 4 slots.

A number of performance analyses were made comparing this embodiment of the invention relating to IRLP-with the IS-130 radio link protocol combined with the IS-136+ higher modulation format. The following assumptions were made in each simulation.

1. Coherent detection.
2. Ideal channel state information (CSI). The effect of non-ideal channel state information through practical estimation methods such as pilot symbols in the case of coherent detection or differential detection will affect each protocol equally; hence their relative performance remains the same.
3. Zero ISI, perfect symbol timing.
4. A feedback round trip delay of 300 ms.

Figure 12:
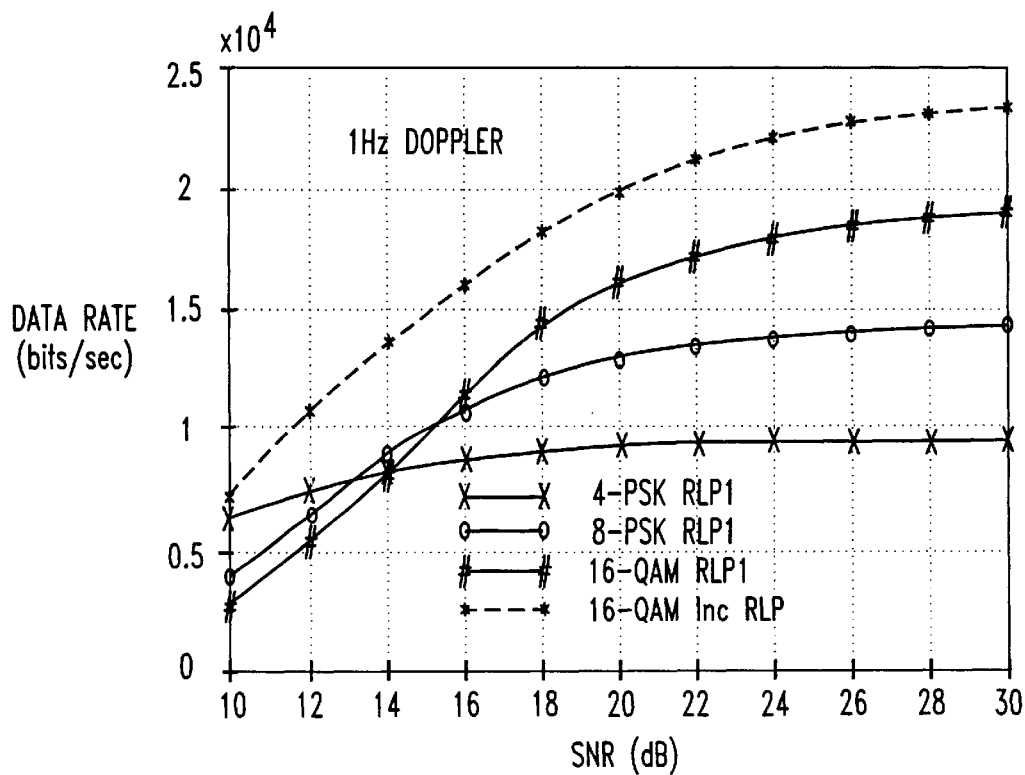
FIG. 12 illustrates the throughput results of one embodiment of the invention versus the IS-130 protocol for low Doppler frequencies.
Figure 13:
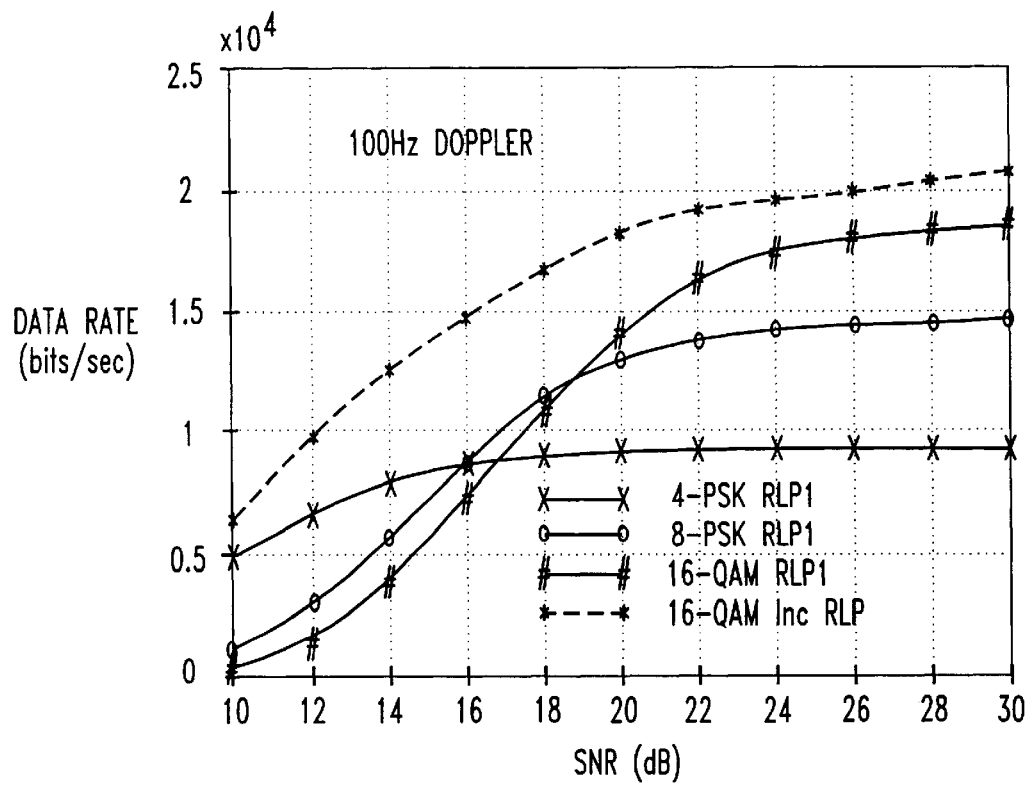
FIG. 13 illustrates the throughput results of one embodiment of the invention versus the IS-130 protocol for high Doppler frequencies.

FIGS. 12 and 13 illustrate the throughput results of one embodiment of the invention versus the IS-130 protocol for low and high Doppler frequencies, respectively. The incremental redundancy parameters used are those of Table 4, with D=5, unquantized soft decision information and 16-QAM modulation. The throughput results for RLP1 are shown for modulation formats 4-PSK, 8-PSK and 16-QAM. The horizontal axis is average SNR per symbol.

As shown in FIG. 12, for low Doppler, the protocol gains approximately 20% in throughput at high SNR due to uncoded transmission (in contrast to rate ⅚ coding used in IS-130), while at low SNR the gain is about 3 dB due to the incremental redundancy.

As shown in FIG. 13, at high Doppler, the protocol gains approximately 10% in throughput because uncoded modulation is not as affective due to errors being more evenly distributed. At lower SNR the protocol gains between 2 to 5 dB versus the best modulation format for IS-130.

Delay is an important factor in user-perceived throughput. With respect to a particular implementation, any delay associated with this embodiment of the invention can be reduced by decreasing the parameter D, that is, the number of sub-blocks comprising a data block.

Figure 14:
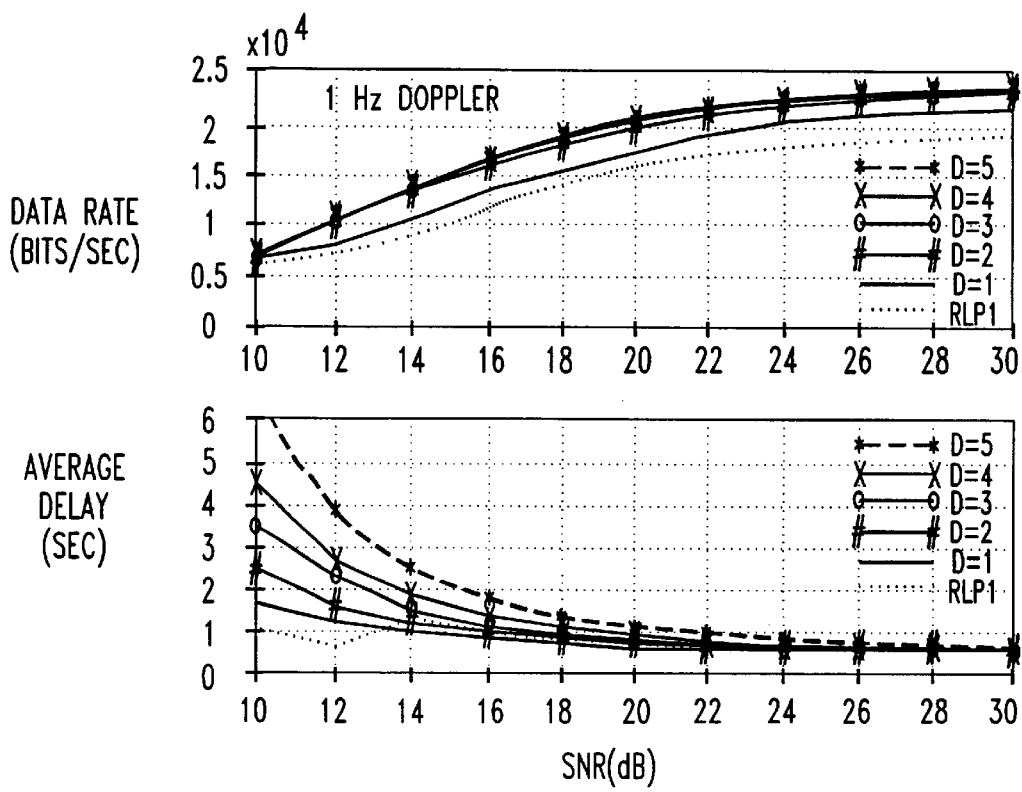
FIG. 14 illustrates the throughput and average delay for D=1,2,3,4 and D=5 for low Doppler frequencies in accordance with one embodiment of the invention.
Figure 15:
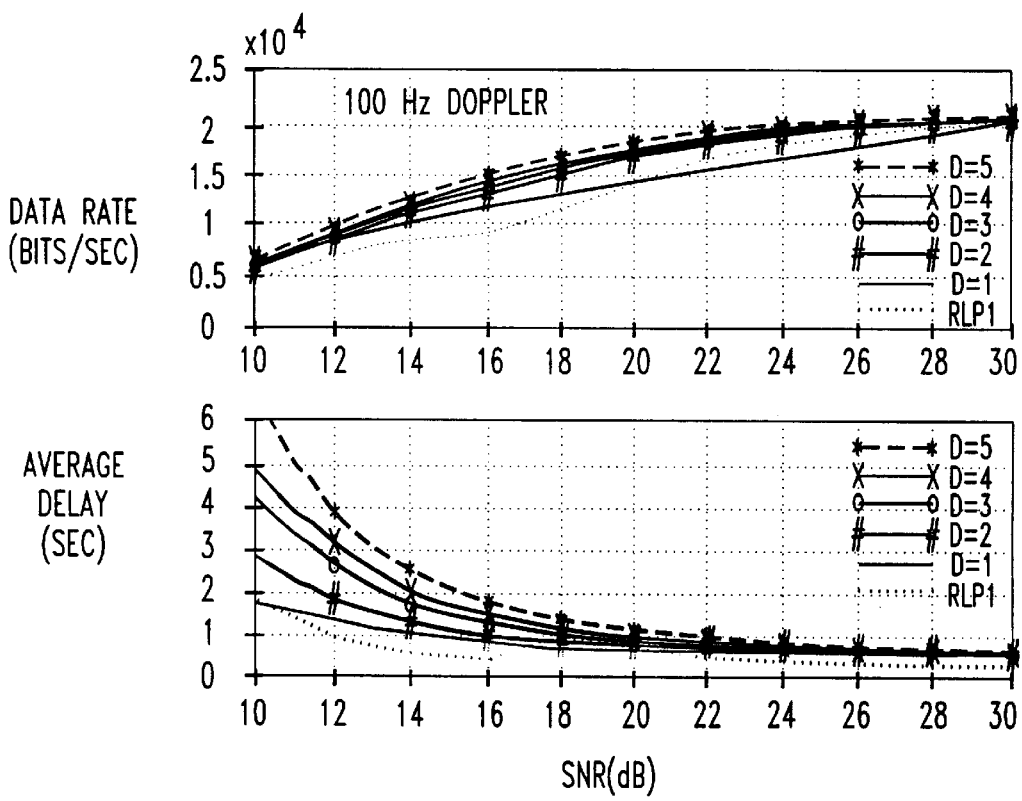
FIG. 15 illustrates the throughput and average delay for D=1,2,3,4 and D=5 for high Doppler frequencies in accordance with one embodiment of the invention.

FIGS. 14 and 15 plot the throughput and average delay for D=1,2,3,4 and D=5 for low and high Doppler frequency, respectively. As seen in FIG. 14, for low Doppler, decreasing D significantly reduces delay while having a small effect on throughput up to D=2. At D=1 the throughput drops significantly. This is also true for high Doppler as shown in FIG. 15. A value of D=2 provides a good compromise between throughput and delay.

In one embodiment of the invention, the service specification of layer-1 was defined to transport bits to be delivered as soft-information bits to layer-2. In another embodiment of the invention, the specification can be changed such that layer-i performs the header encoding and delivers to layer-2 the soft sub-block and the numbers NS and NB in order to perform mode adaptation and hence transmit either 2, 3, or 4 sub-packets per slot pair or 2 slot pairs. In this manner the headers can be combined, thereby reducing CRC overhead. The optimal header encoding method can be used for each modulation format, e.g., 4-PSK is more robust than 16-PSK hence less header encoding is required.

The effect of the various embodiments of the invention described herein is to decrease the code rate until transmission is successful. By observing the average number of incremental redundancy sub-blocks transmitted per successful decoding as a function of average SNR, it is observed (as expected) that the number of sub-blocks transmitted at low SNR is much greater than at high SNR with the corresponding increase in delay. This observation leads to another embodiment of the invention which is described below.

In yet another embodiment of the invention, a method for adaptively reducing the delay is possible by observing the average number of sub-blocks transmitted and transmit this number immediately without waiting for a negative acknowledgment from the receiver. By transmitting the average number of required sub-blocks immediately, the probability of successful decoding increases greatly and upon failure only 1 or 2 additional sub-blocks are required.

Figure 16:
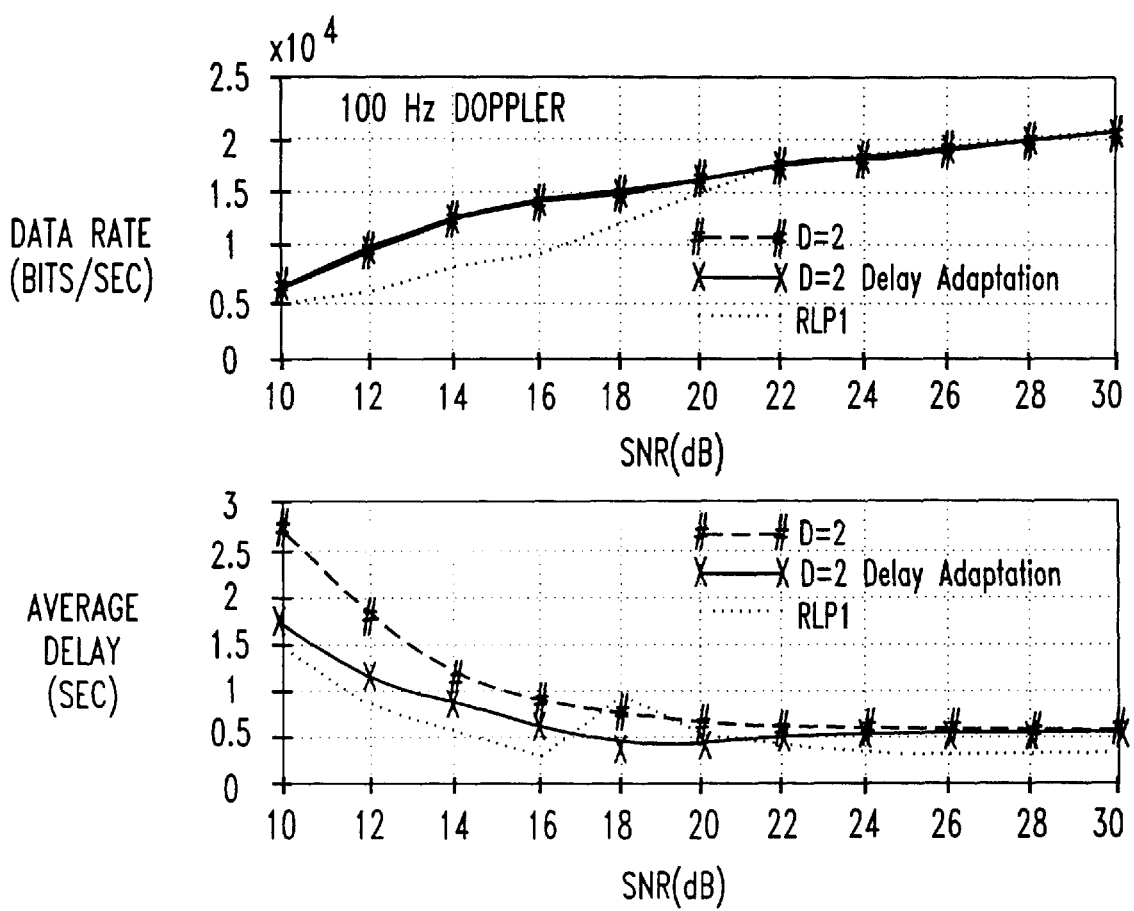
FIG. 16 illustrates the throughput and delay curves for the adapted and non-adapted systems operating at high Doppler in accordance with one embodiment of the invention.

FIG. 16 illustrates the throughput and delay curves for the adapted and non-adapted systems operating at high Doppler in accordance with this embodiment of the invention. It is noted that the average delay at low SNR has been reduced by approximately 30% using this scheme.

The IRLP protocol sends state feedback on the entire receive table. In the special case of D=2, the feedback requirements can be reduced by using the following 2-bit feedback encoding per block $B_i$:

00 Nothing received, sending RLP transmits $D_{i0}$ and $D_{i1}$.

10 Decoding of $B_i$ unsuccessful, receiver requests either $D_{i0}$ or $P_{i0}$ decided by the transmitter depending on previous transmission as shown in Table 5 below.

01 Decoding of $B_i$ unsuccessful, receiver requests either $D_{i1}$ or $P_{i1}$ decided by the transmitter depending on previous transmission as shown in Table 5 below.

11 Decoding of $B_i$ successful.

Table 5 shows the decisions for the transmitter as a function of the feedback and which sub-block of $B_i$ was previously transmitted.

TABLE 5

| Previous | 00 | 10 | 01 | 11 |
|---|---|---|---|---|
| $D_{i1}$ | $D_{i1}, D_{i2}$ | $D_{i1}$ | $D_{i2}$ | — |
| $D_{i2}$ | $D_{i1}, D_{i2}$ | $P_{i1}$ | $D_{i2}$ | — |

TABLE 5-continued

| Previous | 00 | 10 | 01 | 11 |
|---|---|---|---|---|
| $P_{i1}$ | $D_{i1}, D_{i2}$ | $P_{i1}$ | $P_{i2}$ | — |
| $P_{i2}$ | $D_{i1}, D_{i2}$ | $D_{i1}$ | $P_{i2}$ | — |

In this embodiment of the invention, with a PDU length of $L_{PDU}=520$ the required feedback is 50% of previous embodiments of the invention.

To minimize memory requirements for storing the soft decision information at the receiver, the soft decision information is quantized. In this embodiment of the invention, the soft decision information is quantized to 3 levels, i.e., hard-decisions with erasures. This corresponds to about 1.58 bits of stored information per bit of transmitted information. The estimated loss due to 3-level quantization is about 1.2 dB.

As discussed above, encoding module 406 utilizes a binary convolutional encoding scheme to implement IRLP. If a 3-level quantization is to be used, Reed-Solomon codes for which good erasure decoding algorithms are known should be used as an alternative encoding scheme. This would provide up to an additional 1 dB of gain over the convolutional encoding scheme.

The various embodiments of the invention were described above in terms of computer program segments stored in memory 304 and executed by processor 302. It is noted that the computer program segments were shown as separate functional modules. It can be appreciated, however, that the functions performed by these modules can be further separated into more modules, combined into a single module, or be distributed throughout the system, and still fall within the scope of the invention.

Although various embodiments are specifically illustrated and described herein, it will be appreciated that modifications and variations of the present invention are covered by the above teachings and within the purview of the appended claims without departing from the spirit and intended scope of the invention. For example, although memory 304 was described in terms of high-speed computer-readable memory to enhance execution speed, it can be appreciated that the computer program segments implementing the functionality described for each embodiment of the invention can be stored in any computer-readable memory, such as a magnetic storage device (e.g., floppy disk or hard-drive) or optical storage device (e.g., compact-disk read-only memory), and still fall within the scope of the invention. In another example, it can be appreciated that a person of ordinary skill in the art would understand that the functionality for these modules may also be implemented in hardware, or a combination of hardware and software, using well-known signal processing techniques, and still fall within the scope of the invention.

What is claimed is:

1. A receiving Incremental Redundancy Radio Link Protocol module (receiving IRLP module) for a receiver, comprising:

a receive transport module that receives soft decision information from a layer 1 protocol;

a quantizer that converts the soft-decision information into a q level representation, where q is a design parameter that trades off receiver memory requirements against system performance and where, for a q level quantization, the memory requirements at the receiver per bit are given by $\log_2 q$;

a decoder that receives at least the q level representation of the soft decision information and decodes the at least the q level representation of the soft decision information to yield a decoded data block, wherein the decoded data block comprises error detection bits of a frame check sequence and a service data unit (SDU);

a frame check sequence decoder that computes a frame check sequence of the SDU and indicates to the receiving IRLP module whether the SDU passed the frame check; and a deblocking module that constructs a deliverable data block by de-concatenating the SDU and the frame check sequence, wherein the de-concatenated SDU is the deliverable data block.

2. The receiving Incremental Redundancy Radio Link Protocol module of claim 1, wherein the decoder uses a soft decision Viterbi algorithm.

3. A method of combining received sub-blocks and jointly decoding the received sub-blocks to recover a data block, each received sub-block identified by at least a block sequence number and a sub-block sequence number, comprising:

receiving a packet data unit (PDU) having at least a header portion and sub-block information portion;

decoding the header portion, wherein the header portion includes a block sequence number identifying a data block and a sub-block sequence number identifying a sub-block of the data-block;

determining whether a data block identified by the block sequence number was previously successfully decoded, and if not previously successfully decoded:

setting a flag in a table to indicate which one of a plurality of data sub-blocks and parity sub-blocks the sub-block information portion of the PDU represents;

storing the data in the sub-block information portion of the PDU at a location identified by the block sequence number and the sub-block sequence number;

passing a set of sub-blocks to a decoder, wherein the set of sub-blocks comprises all sub-blocks stored for the block sequence number;

decoding the set of sub-blocks to generate a data block;

computing a frame check sequence of the data block; and if the frame check sequence passes, storing the data block in place of the set of sub-blocks.

4. The method of claim 3, wherein the sub-block information portion comprises data having no redundancy and representing a 1:1 mapping to a blocked service data unit (SDU), wherein a blocked SDU is comprised of a first series of bits concatenated with error detection bits generated for the first series of bits.

5. The method of claim 3, wherein the flag in the table is identified by both the block sequence number and the sub-block sequence number.

6. A computer system comprising a processor and a memory, the memory containing instructions to be executed in accordance with the method of claim 3.

7. A method of decoding incremental redundancy radio link protocol information blocks, each information block identified by at least its block sequence number and sub-block sequence number, comprising:

receiving sub-block soft-information;

storing the sub-block soft-information in one of a plurality of fields in a table, each of the plurality of fields in the table identified by a block sequence number and a sub-block sequence number;

passing all stored sub-blocks identified by the block sequence number to a decoder;

decoding the sub-blocks passed to the decoder to yield a data block and computing a frame check sequence of the data block; and if the frame check sequence passes, storing the data block in place of the passed sub-blocks.

8. The method of claim 7, further comprising setting a flag in a field in the table, the field identified by the block sequence number, to indicate that the data block identified by the block sequence number is successfully decoded.

9. The method according to claim 8, further comprising delivering the data block to a network layer.

10. The method according to claim 9, further comprising deleting all entries in the table corresponding to the block sequence number of the delivered data block.

11. The method according to claim 7, further comprising computing a state feedback packet, wherein the state feedback packet provides state information for the table.

12. A method of decoding packet data units (PDUs) transmitted under an incremental redundancy radio link protocol using a table having a first field that stores a block sequence number, a second field having a first flag, the first flag indicating whether a block corresponding to the block sequence number was correctly decoded, a first plurality of fields, wherein each one of the first plurality of fields stores an indication of whether a data sub-block corresponding to the block sequence number was received, a second plurality of fields, wherein each one of the second plurality of fields stores an indication of whether a parity sub-block corresponding to the block sequence number was received, and a data field that stores soft-decision data bits and soft-decision parity bits according to a sub-block sequence number, the method comprising:

retrieving a PDU, wherein the PDU includes a header and one of a data and a parity sub-block, wherein data in the sub-block is in a form of soft-decision bits;

decoding the header, wherein the header includes the block sequence number, the sub-block sequence number, and a frame check sequence; and verifying the frame check sequence, and if the frame check sequence passes:

setting a flag in one of the first plurality of fields and the second plurality of fields, wherein the flag identifies, by virtue of the sub-block sequence number, which one of the data sub-blocks and parity sub-blocks were received;

quantizing the soft decision bits of the one of the data and parity sub-blocks to yield a quantized soft-information sub-block;

storing the quantized soft-information sub-block at a location corresponding to the block sequence number and the sub-block sequence number;

passing all quantized soft-information sub-blocks corresponding to the block sequence number to a decoder;

decoding, at the decoder, all passed quantized soft-information sub-blocks corresponding to the block sequence number to yield a decoded block;

computing a second frame check sequence of the decoded block, and if the second frame check sequence passes:

storing the decoded block in place of all quantized soft-information sub-blocks corresponding to the block sequence number.

13. The method of claim 12, further comprising setting a flag in the second field to indicate that the block corresponding to the block sequence number was correctly decoded.

14. The method of claim 12, wherein the one of the data and parity sub-blocks comprise a sub-block having no redundancy and representing a 1:1 mapping to a blocked service data unit (SDU), wherein a blocked SDU is comprised of a first series of bits concatenated with error detection bits generated for the first series of bits.

15. The method of claim 12, further comprising discarding the PDU if the first frame check sequence fails.

16. The method of claim 12, further comprising discarding the PDU if, after verifying the first frame check sequence, the second field of the table contains a value that indicates that the block corresponding to the block sequence number was correctly decoded.

17. The method of claim 12, further comprising delivering the decoded blocks of each entry in the table having a flag set in the second field to indicate that the block corresponding to the block sequence number was correctly decoded.

18. The method of claim 17, further comprising deleting all entries in the table corresponding to all delivered blocks.

19. The method of claim 12, further comprising computing a feedback packet, wherein the feedback packet includes state feedback information of the table.

20. A receiver for receiving data transmitted on a physical layer under an incremental redundancy protocol, comprising:

a processor; and a memory, wherein the memory comprises:

a data structure that stores received sub-blocks and decoded blocks until they can be delivered in sequence to a network layer, the data structure comprising:

a first field that stores a block sequence number;

a second field that stores an indication as to whether a block corresponding to the block sequence number was correctly decoded;

a first plurality of fields storing an indication as to whether data sub-blocks of the block corresponding to the block sequence number have been received;

a second plurality storing an indication as to whether parity sub-blocks of the block corresponding to the block sequence number have been received;

a data field that stores soft-decision data and parity sub-blocks corresponding to the block sequence number; and a set of instructions, the set of instructions causing the processor to:

retrieve a PDU, wherein the PDU includes a header and one of a data and a parity sub-block, wherein data in the sub-block is in a form of soft-decision bits;

decode the header, wherein the header includes the block sequence number, a sub-block sequence number, and a frame check sequence;

verify the frame check sequence and if the frame check sequence passes:

set a flag in one of the first plurality of fields and the second plurality of fields, wherein the flag identifies, by virtue of the sub-block sequence number, which one of the data sub-blocks and parity sub-blocks were received;

quantize the soft decision bits of the one of the data and parity sub-blocks to yield a quantized soft-information sub-block;

store the quantized soft-information sub-block at a location corresponding to the block sequence number and the sub-block sequence number;

pass all quantized soft-information sub-blocks corresponding to the block sequence number to a decoder;

decode, at the decoder, all passed quantized soft-information sub-blocks corresponding to the block sequence number to yield a decoded block; and compute a second frame check sequence of the decoded block, and if the second frame check sequence passes, store the decoded block in place of all quantized soft-information sub-blocks corresponding to the block sequence number.

* * * * *